(12) United States Patent
Colmagro

(10) Patent No.: US 10,640,198 B2
(45) Date of Patent: May 5, 2020

(54) PROPELLER FOR AN AIRCRAFT TURBO ENGINE, INCLUDING SAFETY MEANS FOR CONTROLLING BLADE ANGLE OF ATTACK

(71) Applicant: Airbus Operations SAS, Toulouse (FR)

(72) Inventor: Jerome Colmagro, Toulouse (FR)

(73) Assignee: Airbus Operations SAS, Toulouse (FR)

(*) Notice: Subject to any disclaimer, the term of this patent is extended or adjusted under 35 U.S.C. 154(b) by 230 days.

(21) Appl. No.: 15/495,444

(22) Filed: Apr. 24, 2017

(65) Prior Publication Data

US 2017/0313404 A1 Nov. 2, 2017

(30) Foreign Application Priority Data

Apr. 28, 2016 (FR) ...................................... 16 53841

(51) Int. Cl.
| | |
|---|---|
| *B64C 11/32* | (2006.01) |
| *B64C 11/30* | (2006.01) |
| *F16D 1/108* | (2006.01) |
| *F16D 1/08* | (2006.01) |
| *B64C 11/06* | (2006.01) |
| *B64D 27/14* | (2006.01) |
| *B64D 27/00* | (2006.01) |

(52) U.S. Cl.
CPC ............. *B64C 11/32* (2013.01); *B64C 11/06* (2013.01); *B64C 11/30* (2013.01); *B64D 27/14* (2013.01); *F16D 1/0894* (2013.01); *F16D 1/108* (2013.01); *B64D 2027/005* (2013.01); *Y02T 50/66* (2013.01)

(58) Field of Classification Search
CPC ......... B64C 13/00; B64C 11/06; B64C 11/32; B64C 11/30; B64C 11/48; B64D 27/14; B64D 2027/005; F16D 1/0894; F16D 1/108; Y02T 50/66
USPC ................................................... 416/120, 129
See application file for complete search history.

(56) References Cited

U.S. PATENT DOCUMENTS

| 1,816,317 A | 7/1931 | Dicks | |
|---|---|---|---|
| 3,549,272 A * | 12/1970 | Bouiller | .................. F01D 5/022 |
| | | | 415/130 |

(Continued)

FOREIGN PATENT DOCUMENTS

| EP | 0779130 | 6/1997 |
|---|---|---|
| EP | 2524866 | 11/2012 |

(Continued)

OTHER PUBLICATIONS

French Search Report, dated Jan. 3, 2017, priority document.

*Primary Examiner* — Justin D Seabe
*Assistant Examiner* — Hakeem M Abdellaoui
(74) *Attorney, Agent, or Firm* — Greer, Burns & Crain Ltd.

(57) ABSTRACT

In order to simplify the design of an aircraft turbo engine propeller while enhancing the safety function thereof related to control of the blade angle of attack, a propeller is provided comprising a secondary rotational coupling to couple in rotation, along the radial axis of the blade, the inner radial end of the blade root with a mechanical joining member of a blade angle of attack control device, the secondary coupling being designed and configured to be active in the event of failure of the main pin.

12 Claims, 12 Drawing Sheets

(56) References Cited

U.S. PATENT DOCUMENTS

| | | | | |
|---|---|---|---|---|
| 5,186,609 A * | 2/1993 | Inoue | ...................... | B64C 11/48 |
| | | | | 416/129 |
| 5,263,898 A * | 11/1993 | Elston, III | .............. | B64C 11/06 |
| | | | | 416/129 |
| 5,431,539 A * | 7/1995 | Carvalho | ................ | B64C 11/32 |
| | | | | 416/157 R |
| 5,597,334 A * | 1/1997 | Ogino | ...................... | B63H 5/10 |
| | | | | 184/6.12 |
| 8,740,565 B2 * | 6/2014 | Perkinson | ............... | B64C 11/48 |
| | | | | 416/129 |
| 9,284,041 B2 * | 3/2016 | Belmonte | ................ | B64C 11/32 |
| 9,429,031 B2 * | 8/2016 | Perdrigeon | ............ | F01D 5/3023 |
| 9,593,708 B2 * | 3/2017 | Cassagne | ................ | F16B 39/24 |
| 9,896,189 B2 * | 2/2018 | Tajan | .................... | B64C 11/346 |
| 10,118,710 B2 * | 11/2018 | Derrez | .................... | B64C 11/02 |
| 2010/0239421 A1 * | 9/2010 | Boston | .................... | B64C 11/06 |
| | | | | 416/136 |
| 2012/0294718 A1 | 11/2012 | Thornton et al. | | |
| 2013/0115083 A1 * | 5/2013 | Vuillemin | ............. | B64C 11/003 |
| | | | | 416/1 |
| 2013/0343896 A1 | 12/2013 | Mackie et al. | | |
| 2014/0093313 A1 | 4/2014 | Carbone | | |
| 2016/0016603 A1 | 1/2016 | Tinnin et al. | | |

FOREIGN PATENT DOCUMENTS

| | | |
|---|---|---|
| FR | 2943984 | 10/2010 |
| FR | 2943985 | 10/2010 |
| GB | 437406 | 10/1935 |

\* cited by examiner

PROPELLER FOR AN AIRCRAFT TURBO ENGINE, INCLUDING SAFETY MEANS FOR CONTROLLING BLADE ANGLE OF ATTACK

CROSS-REFERENCES TO RELATED APPLICATIONS

This application claims the benefit of the French patent application No. 1653841 filed on Apr. 28, 2016, the entire disclosures of which are incorporated herein by way of reference.

TECHNICAL FIELD

The present invention relates to an aircraft turbo engine propeller. It more particularly concerns managing the radial retention of the propeller blades, and managing control of the angle of attack thereof. In particular, the invention relates to the safety function in the event of failure of the main means for controlling the angle of attack of the blades, this function also being called the "Fail Safe".

The invention preferably applies to turbo engines with two contra-rotating open propellers, also known as "Open Rotor" or "CROR" ("Contra Rotative Open Rotor") turbo engines. Nevertheless, the invention may also apply to any other turbo engine comprising one or more propellers, such as, for example, turboprops.

BACKGROUND OF THE INVENTION

Aircraft turbo engine propellers have already been the subject of numerous developments, in particular as regards the management of the safety function in the event of failure of a blade. This "Fail Safe" function makes it possible to ensure that, following a failure of the main pin for retaining the blade, the blade can still be retained radially, relative to the hub of the propeller. Designs for ensuring such a function are for example disclosed in documents FR 2 943 984 and FR 2 943 985.

Moreover, also in the event of failure of the main pin, the latter is no longer capable of controlling the angle of attack of the blades. Therefore, there is a need to optimize existing solutions to meet the increasingly high demands in terms of the Fail Safe function, while simplifying the design to reduce the costs thereof.

SUMMARY OF THE INVENTION

In order to at least partially meet this need, the subject matter of the invention is a propeller for an aircraft turbo engine comprising:

a hub centered on an axis of rotation of the propeller;

a plurality of propeller blades, each having a blade root with an inner radial end and, associated with at least one of the blades:

a blade angle of attack control device designed and configured to vary the blade angle of attack by pivoting the blade about a radial axis of the blade, the angle of attack control device comprising a mechanical joining member for joining with the inner radial end of the blade root;

a main pin for retention of the blade in a radial direction thereof, the main retention pin coupling, in translation and in rotation, along the radial axis of the blade, the blade root to the angle of attack control device by passing through the inner radial end and the mechanical joining member; and a secondary element for retention of the blade in the radial direction thereof, the secondary element being designed and configured to be active in the event of failure of the main pin.

According to the invention, the propeller comprises secondary rotational coupling means for coupling in rotation, along the radial axis of the blade, the inner radial end with the mechanical joining member, the secondary means being designed and configured to be active in the event of failure of the main pin.

The invention thus offers a clever design for obtaining a Fail Safe function for controlling the angle of attack of the blades, which is nonetheless based on a simple design, comprising a limited number of elements. It thus offers a solution which is very satisfactory in terms of safety and costs.

The invention preferably has at least one of the following optional features, taken alone or in combination.

According to a first preferred embodiment of the invention, the inner radial end and the mechanical joining member define a male/female assembly constituting all or part of the secondary rotational coupling means, by virtue of an interface of non-circular cross section. In this regard, note that the cross section may include at least one straight portion, for rotational coupling of the two elements. More specifically, the cross section may have an overall elliptical shape or polygonal shape, for example, square, rectangular, hexagonal.

According to a second preferred embodiment, possibly combinable with the first embodiment, the secondary rotational coupling means comprise:

a coupling member extending in the radial direction of the blade and being rigidly secured in rotation to one of the elements, either the inner radial end or the mechanical joining member; and a groove extending in the radial direction of the blade and made on the other of the elements, either the inner radial end or the mechanical joining member, the coupling member being housed in the groove.

In this second embodiment, the coupling member may be a key or a rib made as a single piece with the one of the elements, either the inner radial end or the mechanical joining member.

Whichever of the above two preferred embodiments is chosen, the propeller may further include:

a hollow member forming an integral part of the hub and defining a receiving cavity through which the blade root passes; and a rotation guide device for the blade root, the rotation guide device being housed in the receiving cavity, between a side wall of the hollow member and the blade root.

Moreover, in an assembled configuration of the propeller, the receiving cavity has the secondary retention element, the secondary retention element passing through a receiving orifice of the blade root, and being arranged, in the radial direction, at a distance from a radial abutment element formed by the hollow member, the side wall of the hollow member has an orifice for insertion of the secondary retention element into the receiving cavity, the insertion orifice being designed and configured in such a way that the secondary retention element passes through the latter when the propeller is, during assembly, in a configuration for mounting the secondary retention element in which the insertion orifice is aligned with the receiving orifice of the blade root, and the propeller is designed and configured so as to have, in the assembled configuration, an offset in the radial direction between the insertion orifice and the receiving orifice of the blade root.

Alternatively, the propeller may include:

a hollow member forming an integral part of the hub and defining a receiving cavity through which the blade root passes; and a rotation guide device for the blade root, the rotation guide device being housed in the receiving cavity, between a side wall of the hollow member and the blade root, and in an assembled configuration of the propeller, the receiving cavity has the secondary blade retention element passing through a receiving orifice of the blade root, and being arranged, in the radial direction, at a distance from a radial abutment element forming an end wall of the hollow member, the blade root passing through the radial abutment element, which is mounted removably on the side wall of the hollow member.

Preferably, the rotation guide device for the blade root is mounted by screwing in the receiving cavity.

Preferably, propeller comprises a rotation drive shaft centered on the axis of rotation, around which is arranged the blade angle of attack control device.

The invention also relates to an aircraft turbo engine comprising a propeller as described above, the turbo engine preferably comprising a receiver with two contra-rotating open propellers.

Lastly, the invention relates to an aircraft comprising at least one such turbo engine, the latter being preferably attached to the rear part of the fuselage. Alternatively, it may be attached to a wing of the aircraft or to a portion of its fuselage further forward, without departing from the scope of the invention.

Further advantages and features of the invention will be apparent from the following non-limiting detailed description.

BRIEF DESCRIPTION OF THE DRAWINGS

This description will be provided with reference to the accompanying drawings, in which.

DETAILED DESCRIPTION OF THE PREFERRED EMBODIMENTS

Figure 1:
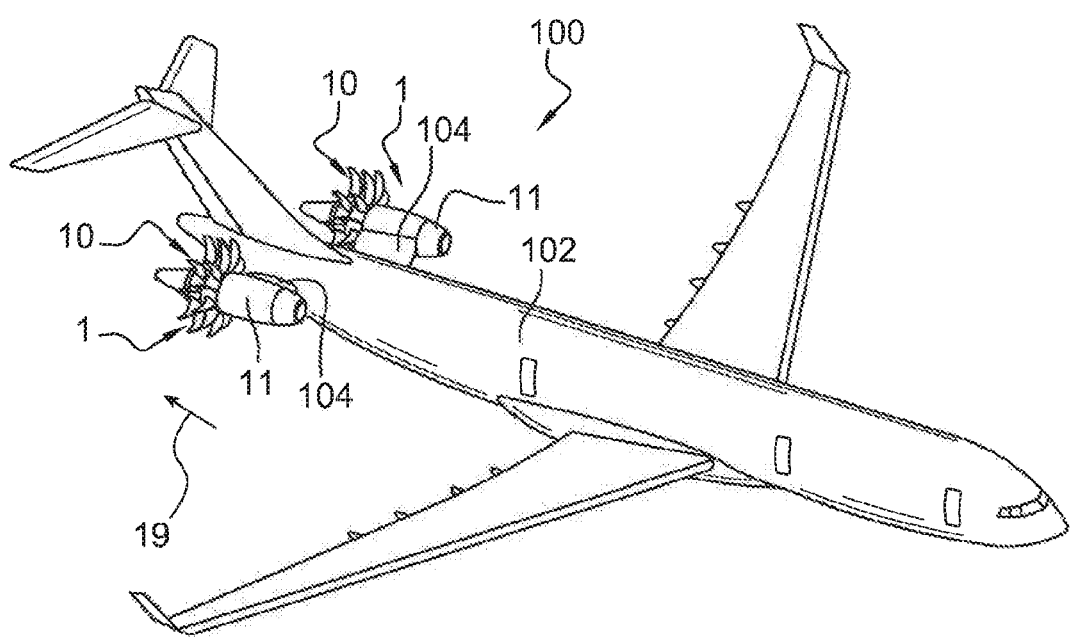
FIG. 1 shows a schematic perspective view of an aircraft comprising turbo engines according to the invention.

Referring first to FIG. 1, this shows an aircraft 100 comprising one or more engine assemblies 1. More specifically, the aircraft comprises two assemblies 1, each attached to the rear part of a fuselage 102 of this aircraft. Each engine assembly 1 is attached conventionally to the fuselage 102 by means of an engine mounting structure 104 or EMS.

Each engine assembly 1 comprises a turbo engine 10 according to the invention, surrounded by a nacelle 11.

Figure 2:
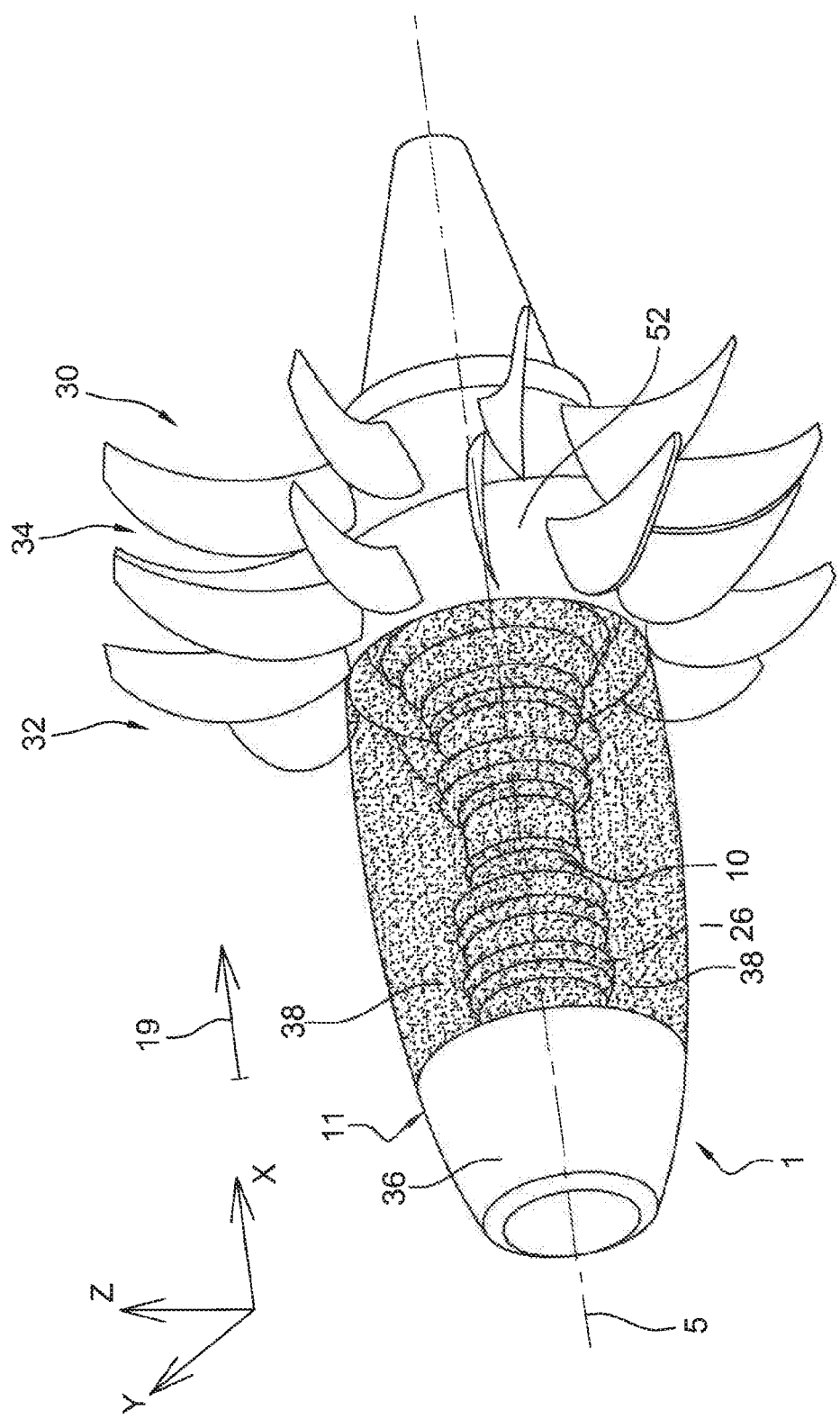
FIG. 2 shows a simplified perspective view of a turbo engine according to a preferred embodiment of the invention.

As can be seen in FIGS. 1 and 2, the turbo engine 10 is of the Open Rotor type in Pusher mode, that is to say it comprises a gas generator as well as a receiver with two contra-rotating open propellers, the receiver being arranged to the rear with respect to the gas generator.

Throughout the description that follows, by convention, the direction X corresponds to the longitudinal direction of the engine assembly 1, which may also be taken as the longitudinal direction of the turbo engine 10 and of this assembly 1. This direction X is parallel to a longitudinal axis 5 of the turbo engine 10. Moreover, the direction Y corresponds to the direction oriented transversely with respect to the engine assembly 1 and may also be taken as the transverse direction of the turbo engine 10, while the direction Z corresponds to the vertical direction or the height. These three directions X, Y and Z are orthogonal to each other and form a direct trihedron.

Moreover, the terms "upstream" and "downstream" are to be considered with respect to a main direction of flow of the gases through the turbo engines 10, this direction being shown schematically by the arrow 19.

In general, each turbo engine 10 comprises, from upstream to downstream, a low pressure compressor 13, a high pressure compressor 12, a combustion chamber 14, a high pressure turbine 16 and a low pressure turbine 18. The low pressure compressor 13 and the low pressure turbine 18 are connected by a low pressure shaft (not shown), while the high pressure compressor 12 and the high pressure turbine 16 are connected by a high pressure shaft (not shown) to form together a gas generator. All these elements are surrounded by an engine housing 26 centered on the axis 5.

Downstream of the low pressure turbine 18, there is provided a receiver 30 with two contra-rotating propellers, namely an upstream propeller 32 and a downstream propeller 34. Although not shown, the propellers are driven by a free power turbine or by an epicyclic gear train.

Upstream of the receiver 30, the turbo engine 10 is surrounded by a nacelle 11 comprising an air inlet 36, extended rearwards by movable hoods 38 providing access to the equipment of the turbo engine, for maintenance operations.

One of the specific features of the invention lies in the design of the propellers 32, 34. As their design is identical or similar, only that of the upstream propeller 32 will now be discussed in detail below, with reference to FIGS. 3 to 7 relating to a first preferred embodiment of the invention.

Figure 3:
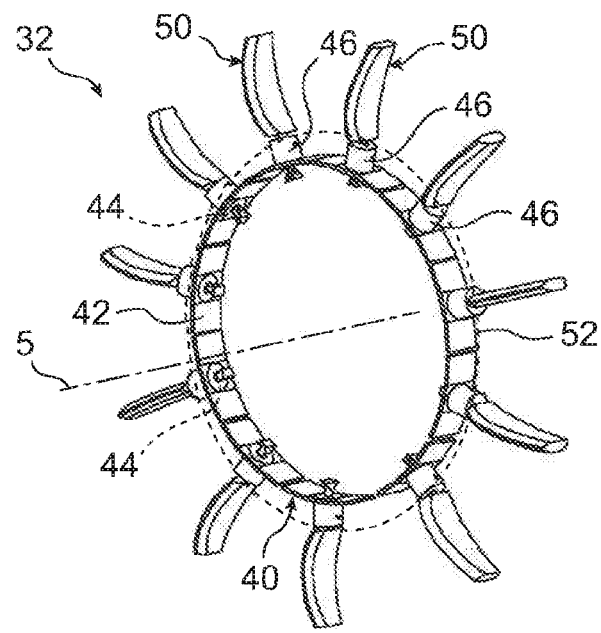
FIG. 3 shows a perspective view of a portion of a propeller fitted to the turbo engine shown in the previous figure, the propeller being shown in the version according to a first preferred embodiment of the invention.

Firstly, with reference to FIG. 3, the propeller 32 comprises a hub 40 centered on the axis of rotation of the propeller, corresponding to the axis 5. This hub 40 comprises a main ring 42 centered on the axis 5, pierced by several openings 44 circumferentially spaced from one another and oriented radially relative to this axis 5. The hub 40 also comprises hollow members 46 associated with the openings 44 and extending radially outwards from the main ring 42. Each hollow member 46 is intended to receive a blade 50 of the propeller, as will be explained in detail hereinafter. Furthermore, the propeller comprises an outer cowling 52 shown only schematically in FIG. 3, this cowling 52 being centered on the axis 5 and arranged around the hollow members 46. Conventionally, the outer surface of this cowling 52 is designed and configured to be hugged by the air circulating around the turbo engine before reaching the propeller blades.

The propeller 32 thus comprises a plurality of blades 50, provided in a number of, for example, between eight and twelve. Each blade 50 is preferably arranged in an identical or similar manner within the propeller. Consequently, only the arrangement of one blade 50 will now be described, with reference to FIGS. 4 to 6.

The blade 50 conventionally comprises a root 54 bearing a vane 56. These two elements 54, 56 succeed one another in the radial direction of the blade, shown by the reference 60 in the figures. Note that conventionally, the radial direction 60 of the blade corresponds to the direction of its length, going from its root to its tip. This radial direction 60 also corresponds to that of the axis 62 about which the angle of attack of the blade is intended to be controlled, as will be explained hereinafter.

The blade 50 may be made in a conventional manner, for example made entirely of composite material.

The blade root 54 has, in the radially upper part, a cylindrical shape of circular cross section, with an axis 62 parallel to the radial direction. One of the ends thereof is connected to the vane 56, while the other end, namely its inner radial end 64, is arranged radially inwards with respect to the main ring 42 of the hub 40. This end 64 is mechanically coupled to a blade angle of attack control device 66 of conventional design known to the person skilled in the art. In this regard, note that the propeller 32 comprises a rotation drive shaft 68 centered on the axis 5, around which is arranged the angle of attack control device 66. In a known manner, the rotational movement of the device 66 relative to the drive shaft 68, about the axis 5, makes it possible to cause an axial relative movement between these two elements 66, 68, which thereby causes the blade root 54 to pivot about its axis 62.

The mechanical coupling between the end 64 of the root 54 and the angle of attack control device 66 is performed by a pin 70 constituting a main pin 70 for radial retention of the blade 50. To be specific, this pin 70 passes through the blade end 64 and through a mechanical joining member 72 located at the end of the angle of attack control device 66. It thus makes it possible to retain the blade 50 in the radial direction 60, by preventing it from moving radially outwards from the hub 40, under the effect of the centrifugal force observed during operation.

Thus, by passing through both the inner radial end 64 of the blade root 54 and the mechanical joining member 72 of the angle of attack control device 66, the main pin 70, oriented orthogonally to the radial axis 62, serves to couple these two elements 54, 66 in translation and in rotation about the axis 62.

The hollow member 46 extends along the axis 62, on which it is centered. It is open at its axial end located at the opening 44 in the main ring 42, whereas it is closed at its opposite end. The latter is formed by a closing wall 76 through which the blade root 54 passes, arranged orthogonally to the root. The hollow member 46 also includes a side wall 78, which is centered on the axis 62 and delimits with the closing wall 76 a receiving cavity 80 opening out to the opening 44. The side wall 78 is cylindrical, preferably of ring-shaped cross section centered on the axis 62. The cavity 80 thus has a cylindrical shape of circular cross section, of diameter D1.

The hollow member 46 may be made in one piece, or with various elements attached to one another, for example with the closing wall 76 attached to the side wall 78.

The blade root 54 passes through the receiving cavity 80 and extends beyond the opening 44 in the radial inward direction. The propeller 32 also comprises a device 82 for guiding the blade root 54 in rotation, this device preferably taking the form of a roller bearing.

This guide device 82 is housed in the receiving cavity 80, and is also centered on the axis 62, and is arranged between a side wall 78 and the blade root 54. Its outside diameter is substantially identical to the diameter D1 of the receiving cavity 80. Moreover, the outer surface of the guide device 82 comprises an external thread 84 allowing the assembly of this device 82 by screwing onto a corresponding thread 86 provided inside the cavity 80 on the inside surface of the side wall 78.

Figure 4:
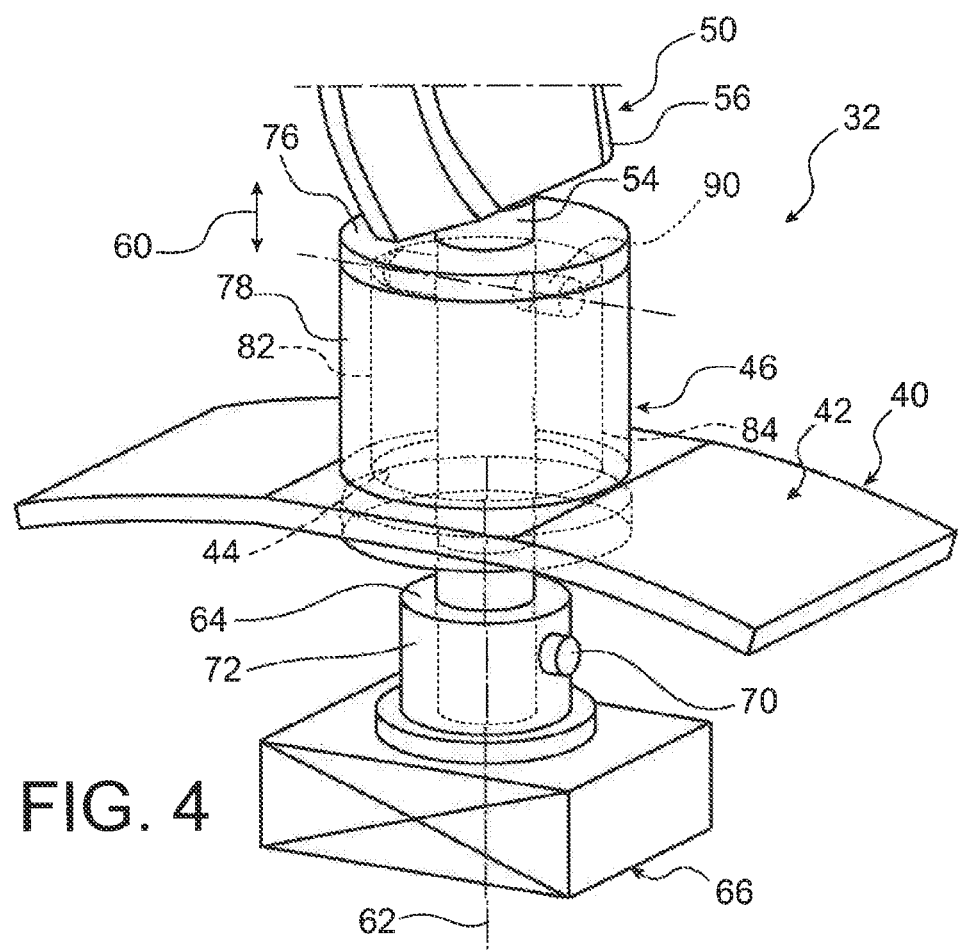
FIG. 4 shows an enlarged perspective view of a portion of the propeller shown in the previous figure.
Figure 5:
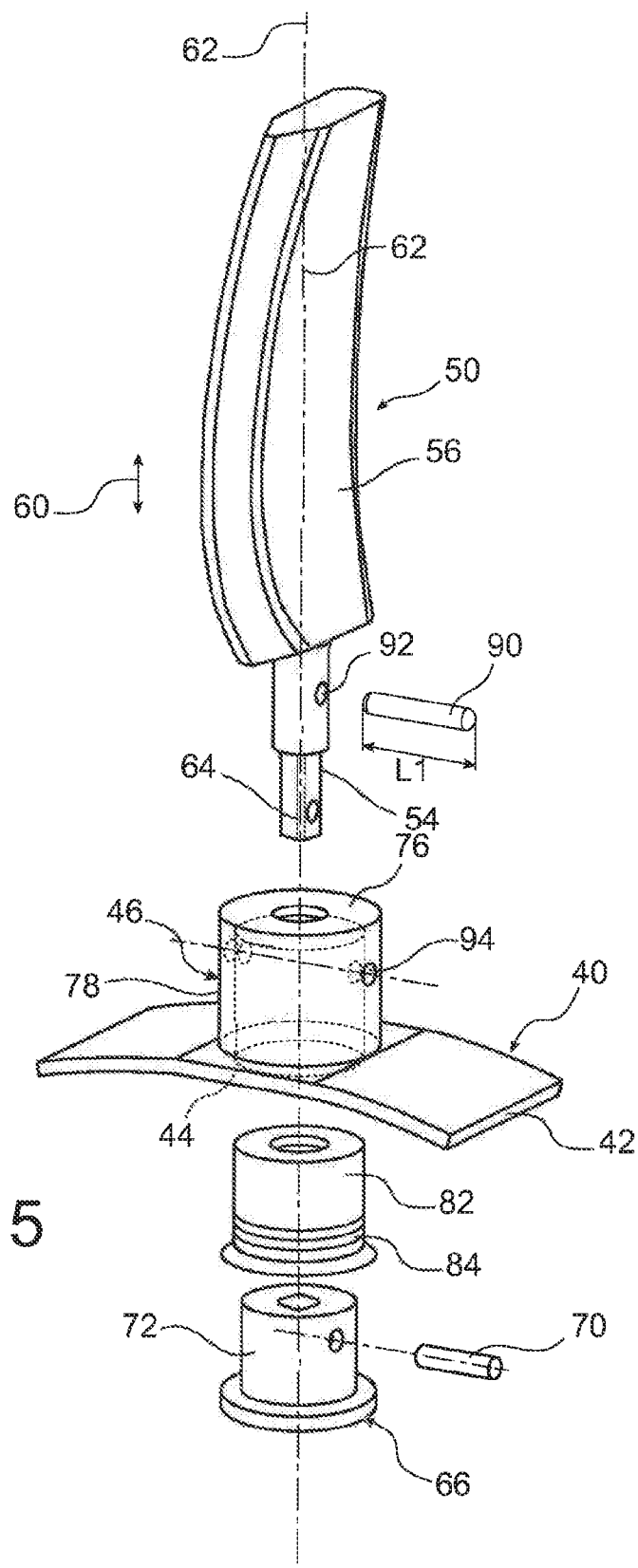
FIG. 5 shows an exploded perspective view of the portion of the propeller shown in the previous figure.
Figure 6:
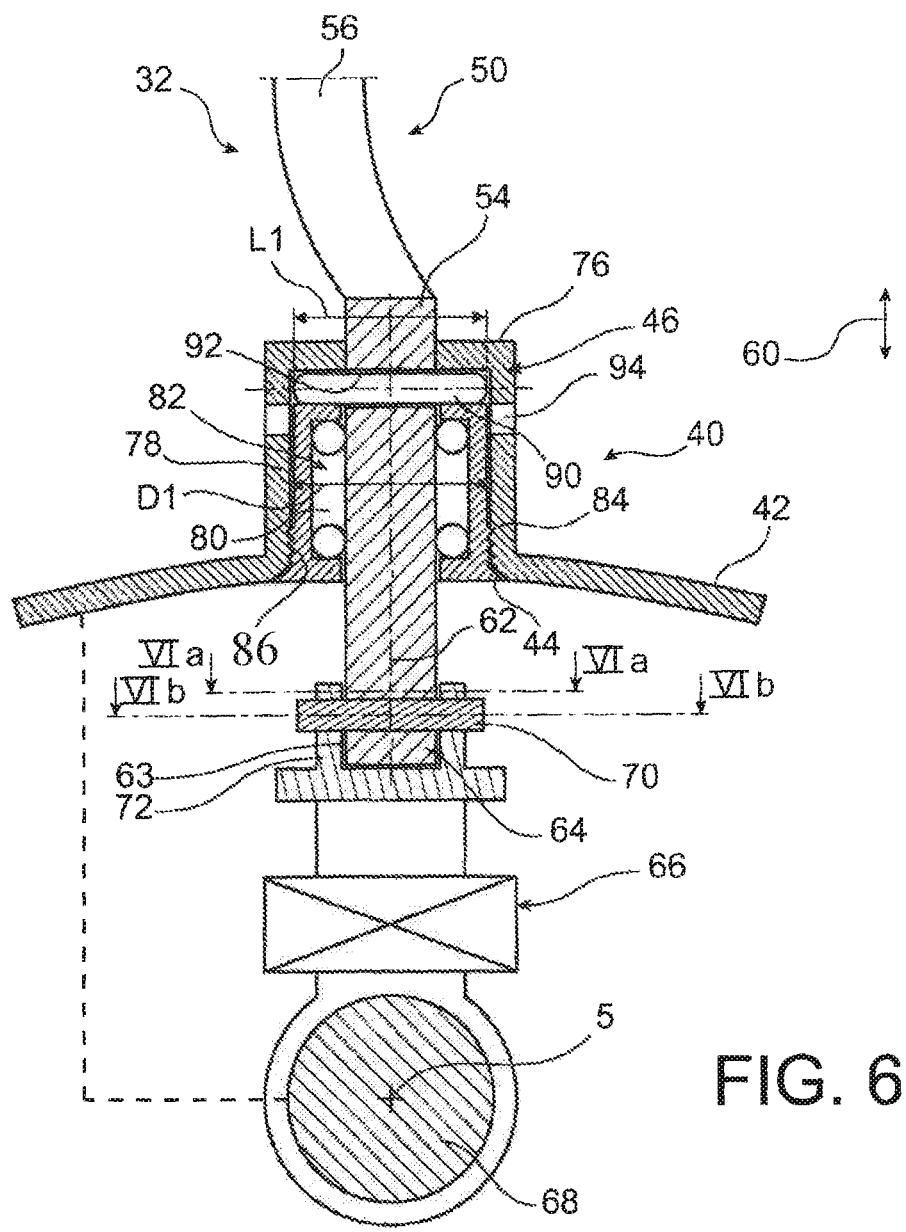
FIG. 6 is a cross-sectional view of the propeller shown in the previous figures.

In the assembled configuration of the propeller 32 as shown in FIGS. 4 and 6, the receiving cavity 80 has another pin 90 forming a secondary element for radial retention of the blade 50. This pin 90, or retention pin, has a Fail Safe safety function with respect to the risk of loss of the blade root and is thus configured and assembled so as to be active in the event of failure of the main pin 70 or failure of the blade root 54.

More precisely, the pin 90 is cylindrical with a circular cross section, and passes through a receiving orifice 92 of corresponding shape, made in the blade root 54. A tight fit may be provided so that the pin 90 may be frictionally retained by the orifice 92. Nevertheless, this tight fit is not necessary, since in operation the pin 90 is in any case designed and configured to be retained inside the hollow member 46.

The pin 90 projects on either side of the receiving orifice 92 and has a length L1 slightly less than the diameter D1 of the cavity 80 so that this pin 90 is not in contact with the inside surface of the side wall 78 of the hollow member 46.

The portions of the pin 90 that project from the blade root are positioned at a distance from the closing wall 76 in the radial direction 60 so as to avoid contact. The pin 90 is preferably parallel to the closing wall 76.

Thus, the pin 90 is on standby, in other words it is only intended to come into contact with the closing wall 76 in the event of failure of the main pin 70, for example in the event of a breakage of the latter. In such a case, the main pin 70 is effectively no longer able to retain the blade root 54 radially, meaning that the radial clearance between the closing wall 76 and the pin 90 is rapidly used up under the effect of the centrifugal force applied to the blade 50 of the propeller in rotation. Once the clearance is completely used up, the contact between these elements 76, 90 fulfils very satisfactorily the function of radial retention of the blade root 54. For this reason, the pin 90 is considered to fulfil the Fail Safe function in the event of a failure of the blade root 54 and/or the main pin 70, from the viewpoint of radial retention of the blade.

Regarding the Fail Safe function related to control of the angle of attack of the blade, it is first of all noted that in the absence of a failure, control of the angle of attack is achieved by virtue of the rotation of the blade root 54 by the mechanical joining member 72 of the device 66, via the main pin 70. In the event of failure of the latter, there are secondary means for rotational coupling along the radial blade axis 62, between the inner radial end 64 and the mechanical joining member 72. In other words, these secondary means, also known as safety means, are provided in addition to the main pin 70 and are configured to be active in the event of failure of the pin 70. In the first preferred embodiment, the secondary means are created by providing that the inner radial end 64 and the mechanical joining member 72 form a male/female assembly, by being inserted one inside the other. Preferably the mechanical joining member 72 constitutes the female member and the inner radial end 64 of the blade root constitutes the male member, although the reverse solution could be adopted without departing from the scope of the invention.

Figure 6A:
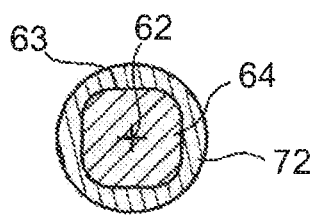
FIGS. 6a and 6b are sectional views respectively along the lines VIa-VIa and VIb-VIb of FIG. 6.
Figure 6B:
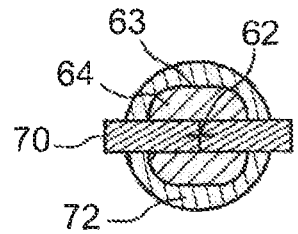

The secondary rotational coupling means are thus, in this case, formed by the interface 63 between the elements 64, 72 nested one inside the other, by virtue of a non-circular cross section of this interface 63. The non-circular cross section, visible in FIGS. 6*a* and 6*b*, is preferably identical all along the nesting between the two elements 64, 72, except where the main pin 70 passes through, as can be seen in FIG. 6*b*.

To ensure driving in rotation, the cross section of the interface 63 comprises at least one straight portion and, more preferably, is of overall polygonal shape, for example square, as is shown in the figures. However, other forms which also ensure the driving in rotation are also possible, such as rectangular, hexagonal, elliptical, etc., shapes.

When there is no failure of the main pin 70, it is therefore the latter that controls the blade angle of attack, possibly in combination with the male/female assembly when a very slight mounting clearance is provided between the mechanical joining member 72 and the inner radial end 64 of the blade root. By contrast, in the event of failure of the main pin 70, the blade angle of attack is controlled purely owing to the interaction between the shapes of the two elements 64, 72. In this regard, note that the shape of the outer side surface of the inner radial end 64, and the shape of the inner side surface of the mechanical joining member 72, are surfaces which are closed laterally and are both substantially identical to the surface of the interface 63. Lastly, the outer side surface of the mechanical joining member 72 is preferably cylindrical, of circular cross section.

Regarding the placement of the secondary pin 90, note that the side wall 78 of the hollow member 46 has an orifice 94 for inserting the pin 90 into the receiving cavity 80. The orifice 94 passing through the wall 78 may optionally be supplemented by another aligned orifice made in the opposite portion of the side wall 78. This complementary orifice may in particular be useful for removing the pin 90, during maintenance operations.

In the assembled configuration of the propeller there is an offset in the radial direction 60 between the insertion orifice 94 and the receiving orifice 92 made through the blade root 54. In other words, in the assembled configuration occupied especially during the operation of the turbo engine, the Fail Safe pin 90 is in a transverse plane different from that of the insertion orifice 94, so that the risk of accidental removal of the pin 90 from the cavity 80 is extremely small. The risk is even non-existent due to the fact that the roller bearing 82 closes this orifice 94, as well as the complementary orifice. In the assembled configuration, only a radially outer portion of the cavity 80 is not occupied by the roller bearing 82, this portion being that in which the protruding portions of the pin 90 are located.

Figure 7:
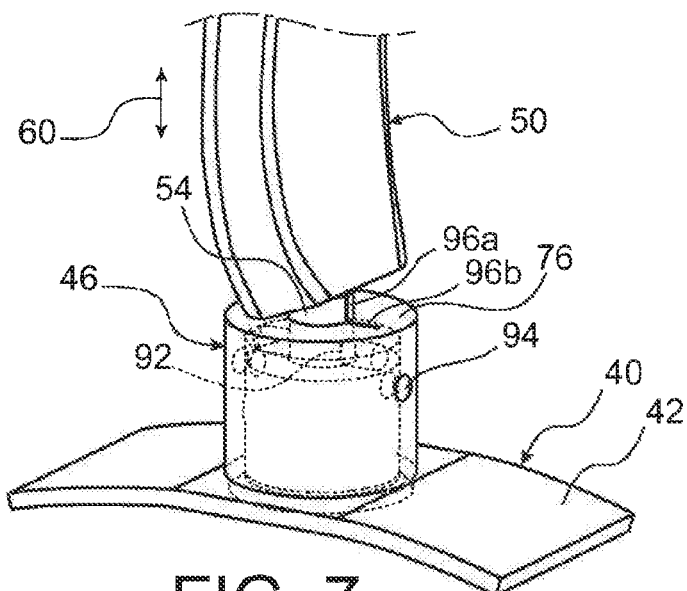
FIG. 7 is a perspective view showing a specific feature of the propeller, designed and configured to facilitate the assembly thereof.

As shown in FIG. 7, the blade root 54 and the closing wall 76 of the hollow member 46 are provided with markers 96*a*, 96*b* which, when lined up, indicate that the receiving orifice 92 and the insertion orifice 94 are in a relative angular position allowing insertion and removal of the pin 90 into and out of the receiving orifice 92 via the orifice 94, provided that these orifices 92, 94 also adopt a suitable relative position in the radial direction 60, so as to be aligned. In this regard, the following figures illustrate a preferred embodiment of a method for assembling the propeller 32, which has been described above.

Figure 8:
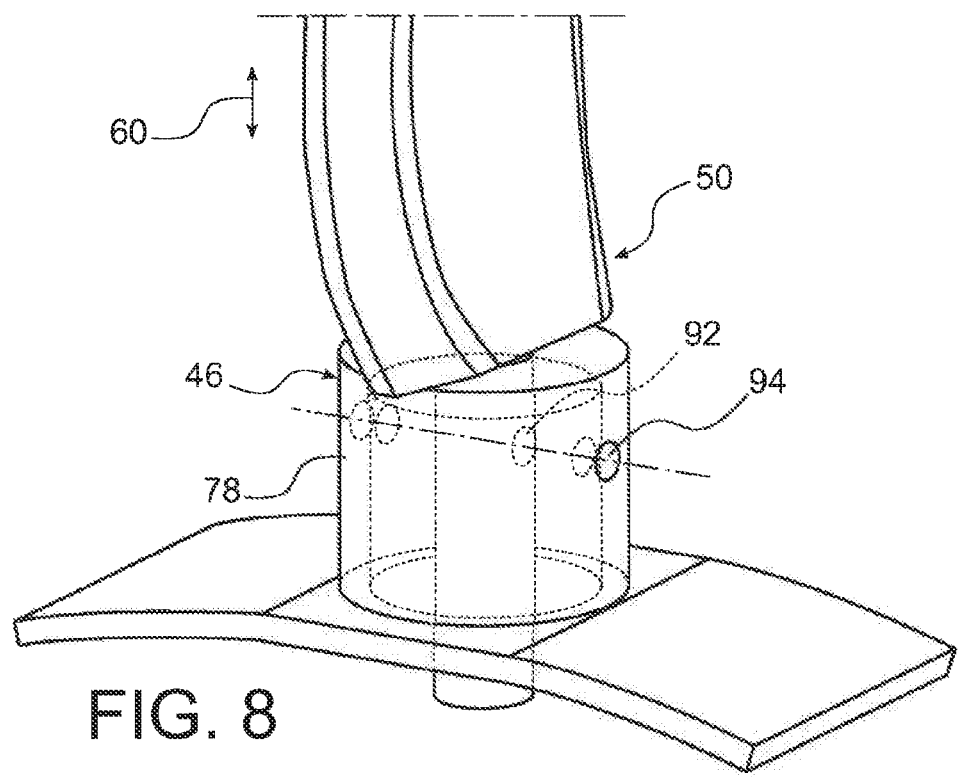
FIGS. 8 to 11b' are views showing the steps of a method for assembling the propeller, according to a preferred embodiment.
Figure 8:
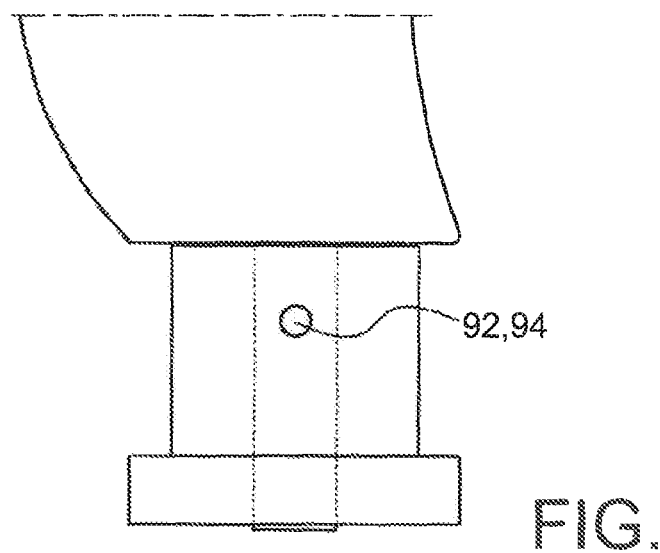

First, with reference to FIGS. 8 and 8', the propeller 32 is brought into a configuration for mounting the retention pin 90 so as to align the insertion orifice 94 with the receiving orifice 92 of the blade root. To this end, the blade 50 is brought into a slightly retracted radial position in which it is located further towards the interior than when it occupies its assembled configuration. Lining up the two marks 96*a*, 96*b* described with reference to FIG. 7 makes it possible to ensure that the two orifices 92, 94 are aligned.

Figure 9A:
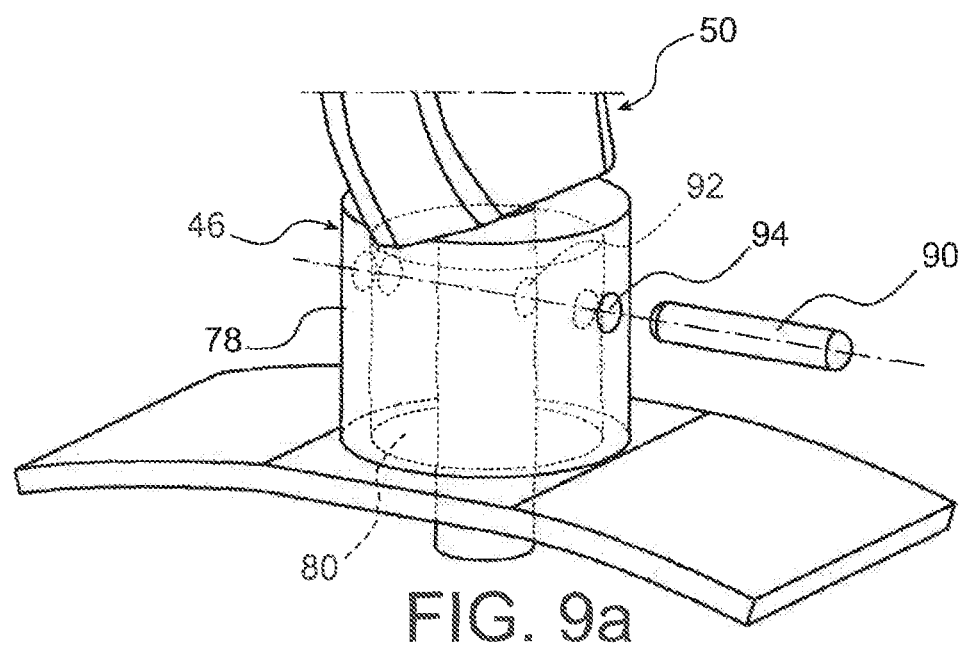
Figure 9B:
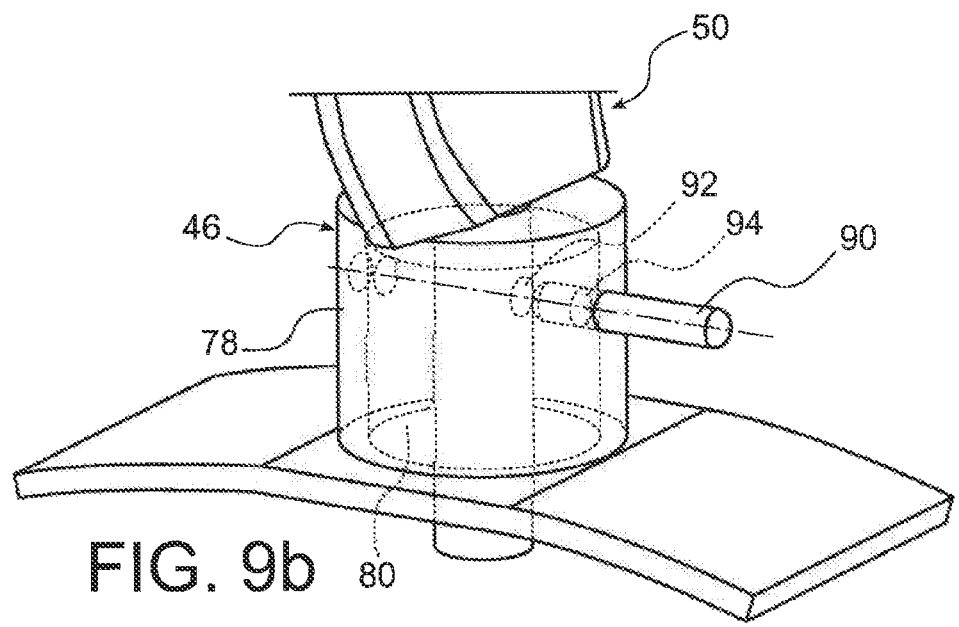
Figure 9C:
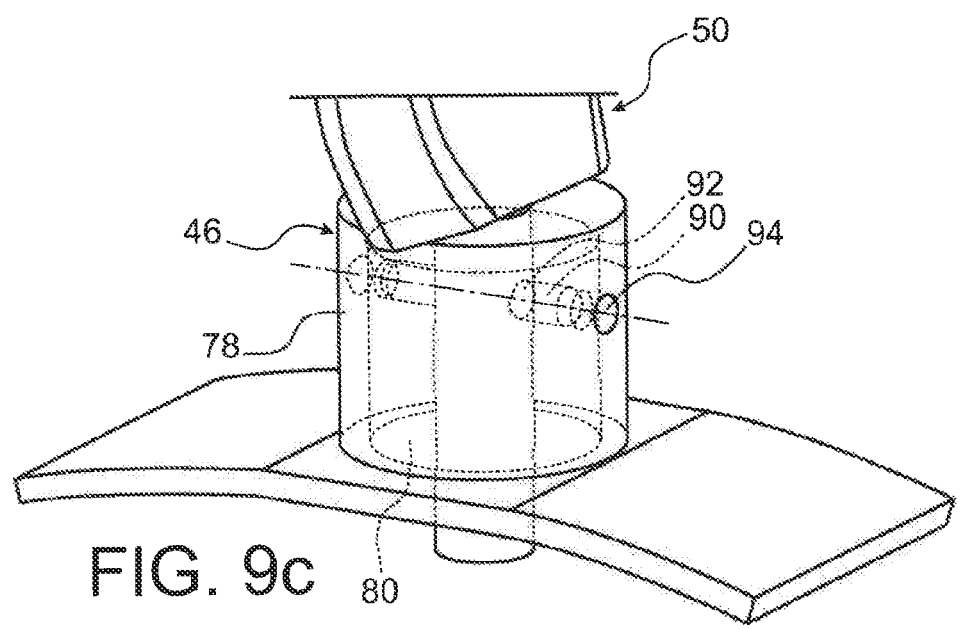
Figure 10:
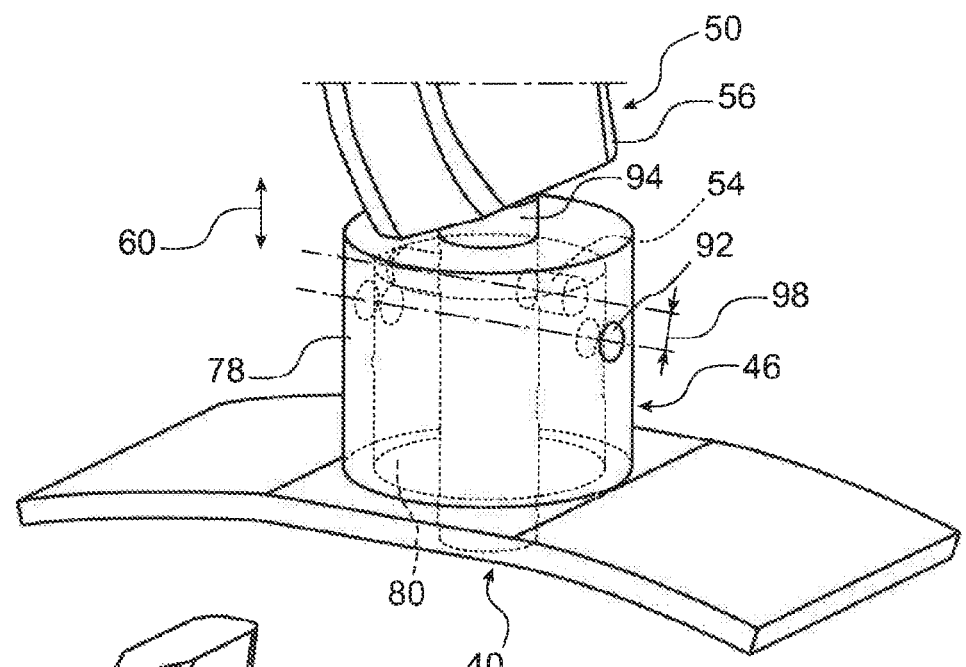

Then, while keeping the blade 50 and the hub 40 in the aforesaid mounting configuration, a step of placing the retention pin 90 in the receiving orifice 92 is carried out. For this purpose, this pin 90 is inserted into the cavity 80 from outside the hollow member 46, by inserting it through the orifice 94 made in the side wall 78, as shown schematically in FIGS. 9*a* to 9*c*. Once the retention pin 90 is fully inserted into the cavity 80 as shown schematically in FIG. 9*c*, the hub 40 and the blade 50 are subjected to relative movement in the radial direction 60, as can be seen in FIG. 10. This movement is achieved by moving the blade 50 radially outwards, which has the consequence of moving the root 54 thereof inside the hollow member 46 and thereby obtaining a radial offset 98 between the insertion orifice 94 and the receiving orifice 92. As mentioned above, this same offset 98 is observed between the insertion orifice 94 and the Fail Safe retention pin 90, preventing the latter from slipping out of the cavity.

Figure 11A:
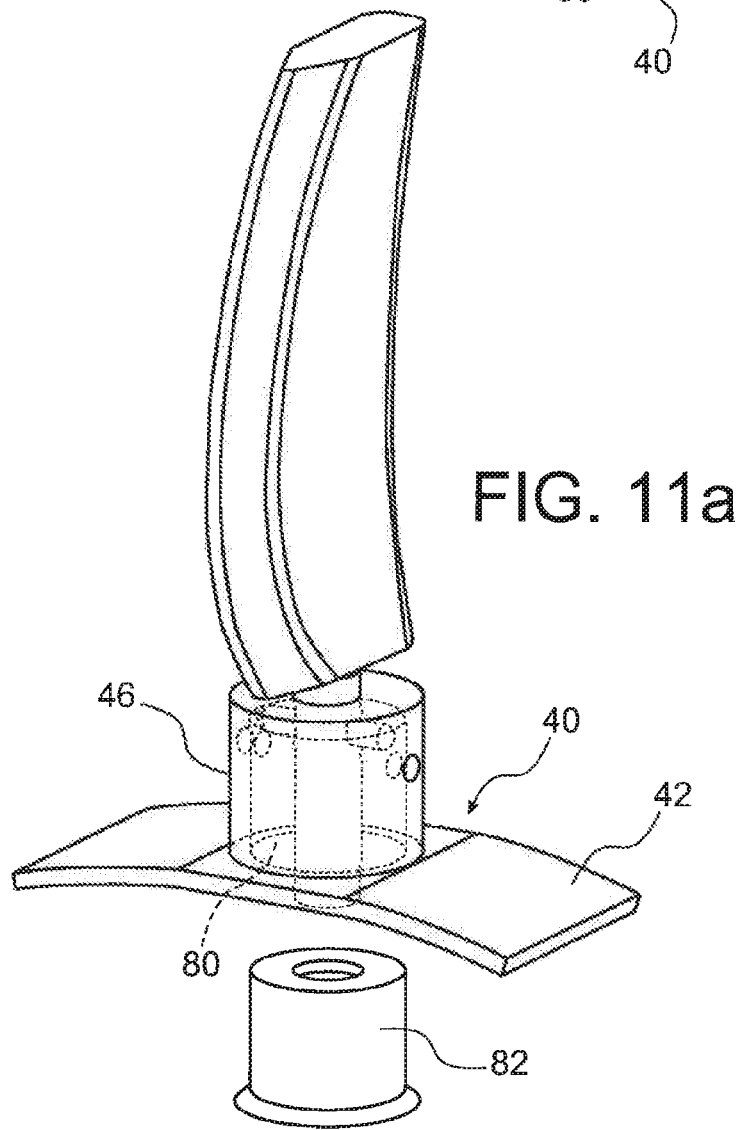
Figure 11B:
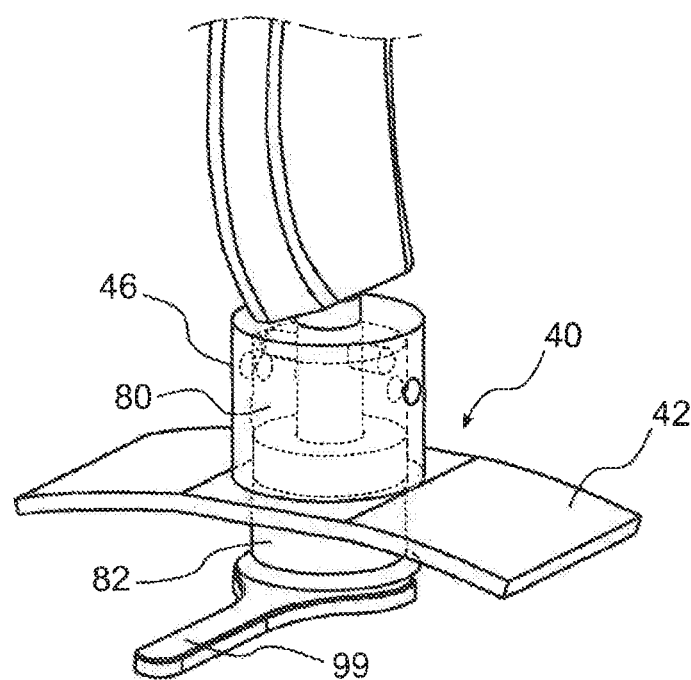
Figure 11B:
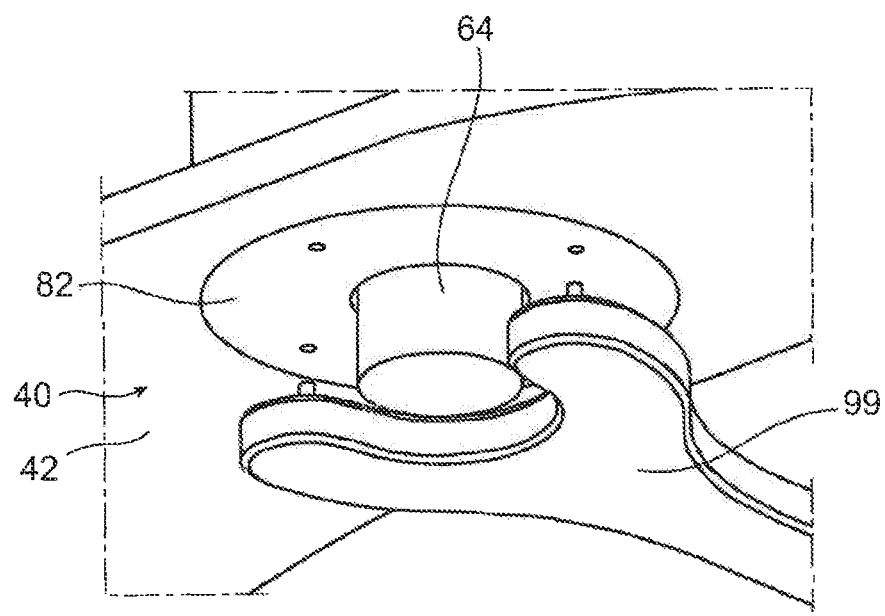

Then, as shown schematically in FIGS. 11*a*, 11*b* and 11*b'*, assembly continues by screwing the roller bearing 82 inside the hollow member 46, via appropriate means 99 interacting with the end wall of the bearing 82.

Lastly, assembly of the propeller is continued by mechanically coupling the inner radial end 64 of the blade root 54 and the mechanical joining member 72 of the angle of attack control device 66, via the main pin 70 which is inserted in these two elements 64, 72, previously nested one inside the other. This makes it possible to bring the propeller 32 into its assembled configuration, shown, in particular, in FIGS. 4 and 6.

Figure 12:
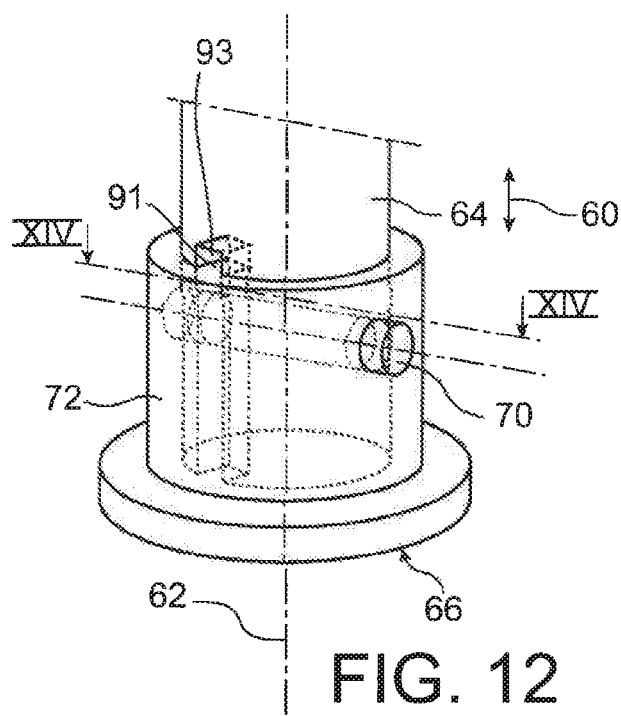
FIGS. 12 to 14 are views showing a second preferred embodiment of the invention, in which the secondary rotational coupling means differ to those used in the first embodiment.
Figure 13:
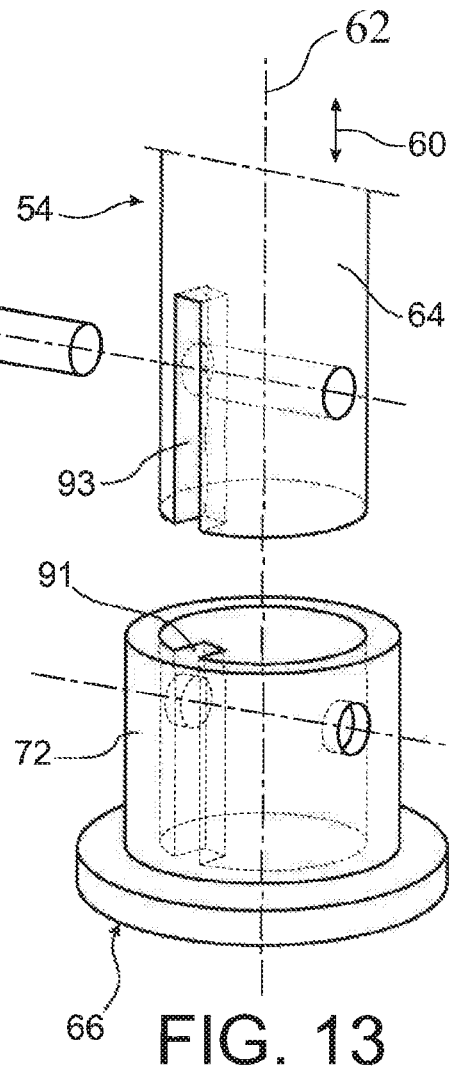
Figure 14:
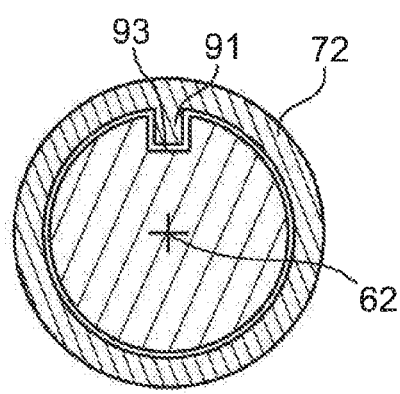

With reference now to FIGS. 12 to 14, a second preferred embodiment of the invention will be described in which the design of the secondary rotational coupling means of the elements 64, 72 differs with respect to the first embodiment.

To be specific, it is no longer necessary to provide an interface of non-circular cross section between the side surfaces of the inner radial end 64 of the blade root 54 and the mechanical joining member 72 of the angle of attack control device 66, and these two surfaces may be generally cylindrical, of circular cross section. However, the secondary rotational coupling means in this case comprise a coupling member 91 arranged at the interface and extending in the radial direction, this coupling member 91 being made as a single piece with the mechanical joining member 72.

More precisely, it takes the form of a rib 91 that projects in the direction of the blade axis 62, inside the hollow defined by this member 72. Note that the rib may be replaced by a key housed in a groove, without departing from the scope of the invention.

The rib 91 interacts with a groove 93 made in the outer side surface of the end 64 of the blade root, also extending in a radial direction 60. Thus, as it is housed in this groove 93, the rib 91 can transmit a rotational movement to the inner radial end 64 of the blade root 54, for controlling the angle of attack of the blade in Fail Safe mode.

Note that the groove 93 is open at the upper end thereof, so that the rib 91 can enter the groove and slide inside when the blade is assembled with the angle of attack control device 66, during which there is a relative translational movement between this blade and the mechanical joining member 72, in the radial direction 60.

Naturally, the groove 93 may be made in the mechanical joining member 72, in which case the rib 91 would be made on the end 64 of the blade root, without departing from the scope of the invention.

Figure 15:
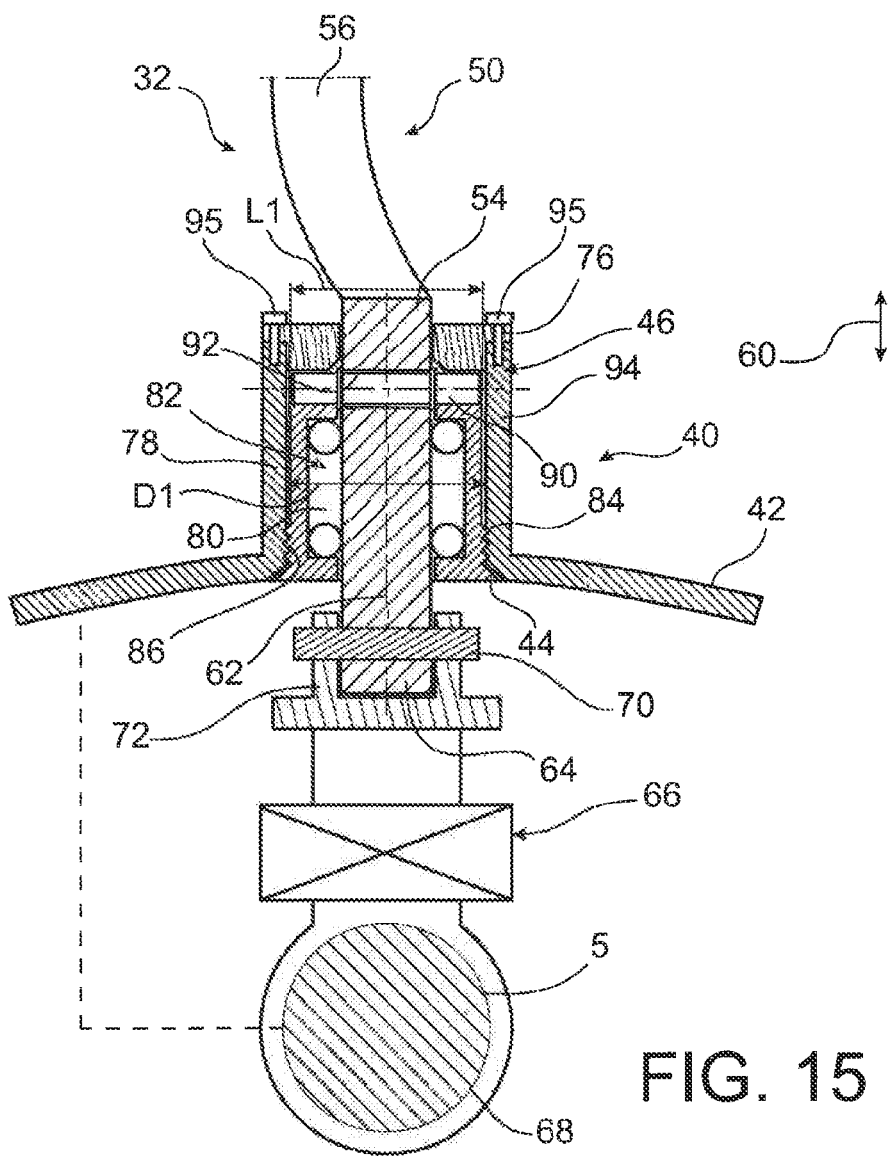
FIG. 15 shows a cross-sectional view similar to that of FIG. 6, with the propeller shown in the version according to an alternative embodiment.

Lastly, FIG. 15 shows an alternative embodiment in which the pin 90 is no longer inserted in the cavity 80 via insertion orifices passing through the side wall 78 of the hollow member 46, but inserted from the upper end of the member 46 via an opening closed off by the radial abutment element 76 which constitutes a removable end wall of this hollow member 46. Therefore, the pin 90 borne by the blade root 54 is inserted in the cavity 80 with the radial abutment element 76 removed from the member 46, then the element 76 is assembled with the side wall 78 of the hollow member 46, using screws 95.

Of course, a person skilled in the art may make various adjustments to the invention which has just been described merely by way of non-limiting examples. In particular, the two preferred embodiments described above may be combined, without departing from the scope of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propeller for an aircraft turbo engine comprising:
a hub centered on an axis of rotation of the propeller;
a plurality of propeller blades, each having a blade root with an inner radial end, and, associated with at least one of said blades:
each of the blades configured to vary a blade angle of attack by pivoting about a radial axis of said blade, the blade being joined at the inner radial end of the blade root to a mechanical joining member;
a main pin for retention of the blade in a radial direction thereof, said main retention pin coupling, in translation and in rotation, along the radial axis of the blade, the blade root to the mechanical joining member; and
a secondary pin for retention of the blade in the radial direction thereof, said secondary pin being designed and configured to be active in the event of failure of the main pin, and
a secondary rotational coupling to couple in rotation, along the radial axis of the blade, the inner radial end with the mechanical joining member said secondary rotational coupling being configured to be active in the event of failure of the main pin;
Wherein the blade is configured to vary the blade angle of attack via torque acting on the main pin or, in the event of failure of the main pin, the second rotational coupling.

2. The propeller according to claim 1, wherein the inner radial end and the mechanical joining member define a male/female assembly constituting all or part of the secondary rotational coupling, by virtue of an interface of non-circular cross section.

3. The propeller according to claim 2, wherein the cross section includes at least one straight portion.

4. The propeller according to claim 2, wherein the cross section has an overall shape which is one of elliptical or polygonal.

5. The propeller according to claim 1, wherein the secondary rotational coupling comprises:
a coupling member extending in the radial direction of the blade and being rigidly secured in rotation to one of the elements, either the inner radial end or the mechanical joining member; and
a groove extending in the radial direction of the blade and made on the other of the elements, either the inner radial end or the mechanical joining member, said coupling member being housed in the groove.

6. The propeller according to claim 5, wherein the coupling member is one of a key or a rib made as a single piece with said one of the elements, either the inner radial end or the mechanical joining member.

7. The propeller according to claim 1, further comprising:
a hollow member forming an integral part of the hub and defining a receiving cavity through which the blade root passes; and
a rotation guide device for the blade root, the rotation guide device being housed in said receiving cavity, between a side wall of the hollow member and the blade root,
wherein, in an assembled configuration of the propeller, said receiving cavity has said secondary retention pin, said secondary retention pin passing through a receiving orifice of the blade root, and being arranged, in the radial direction, at a distance from a radial abutment element formed by the hollow member, and
wherein the side wall of the hollow member has an orifice for insertion of the secondary retention pin into the receiving cavity, the insertion orifice being configured in such a way that the secondary retention pin passes through the latter when the propeller is, during assembly, in a configuration for mounting the secondary retention in in which the insertion orifice is aligned with the receiving orifice of the blade root, and
wherein the propeller is configured so as to have, in the assembled configuration, an offset in the radial direction between the insertion orifice and the receiving orifice of the blade root.

8. The propeller according to claim 1, further comprising:
a hollow member forming an integral part of the hub and defining a receiving cavity through which the blade root passes; and
a rotation guide device for the blade root, the rotation guide device being housed in said receiving cavity, between a side wall of the hollow member and the blade root, and
wherein, in an assembled configuration of the propeller, said receiving cavity has said secondary blade retention pin passing through a receiving orifice of the blade root, and being arranged, in the radial direction, at a distance from a radial abutment element forming an end wall of the hollow member, the blade root passing through the radial abutment element, which is mounted removably on the side wall of the hollow member.

9. The propeller according to claim 7, wherein the rotation guide device for the blade root is mounted by screwing in the receiving cavity.

10. The propeller according to claim 1, further comprising a rotation drive shaft centered on the axis of rotation, around which is arranged the blade angle of attack control device.

11. An aircraft turbo engine comprising a propeller according to claim 1, wherein said turbo engine comprises a receiver with two contra-rotating open propellers.

12. An aircraft comprising:
A fuselage; and
at least one turbo engine according to claim 11.

* * * * *